US006669613B1

(12) United States Patent
Van Denend

(10) Patent No.: US 6,669,613 B1
(45) Date of Patent: Dec. 30, 2003

(54) PRINTING ROLLER HAVING PRINTING SLEEVE MOUNTED THEREON ROLLER

(76) Inventor: Mark E. Van Denend, 349 E. 36th St., Paterson, NJ (US) 07504

( * ) Notice: Subject to any disclaimer, the term of this patent is extended or adjusted under 35 U.S.C. 154(b) by 114 days.

(21) Appl. No.: 09/885,476

(22) Filed: Jun. 20, 2001

(51) Int. Cl.[7] .................................................. B23P 15/00
(52) U.S. Cl. .............................. 492/49; 492/53; 492/56
(58) Field of Search ................................ 492/4, 48, 49, 492/53, 56, 54; 29/895, 895.2, 895.21, 895.23, 895.22, 421.1, 445, 505, 54

(56) References Cited

U.S. PATENT DOCUMENTS

| | | | | | |
|---|---|---|---|---|---|
| 1,493,257 | A | * | 5/1924 | Garner | 492/40 |
| 4,178,664 | A | | 12/1979 | McLoughlin | |
| 4,378,622 | A | | 4/1983 | Pinkston et al. | |
| 4,391,898 | A | | 7/1983 | van der Velden | |
| 4,903,597 | A | | 2/1990 | Hoage et al. | |
| 5,072,504 | A | * | 12/1991 | Thompson | 29/426.6 |
| 5,324,248 | A | | 6/1994 | Quigley | |
| 5,415,612 | A | | 5/1995 | Carlson et al. | |
| 5,497,549 | A | | 3/1996 | Rademacher | |
| 5,520,600 | A | | 5/1996 | Fukumoto | |
| 5,752,444 | A | * | 5/1998 | Lorig | 101/375 |
| 5,896,662 | A | * | 4/1999 | Matsuzawa et al. | 29/895.21 |
| 5,953,992 | A | * | 9/1999 | Calloway | 101/351.7 |
| 5,987,748 | A | * | 11/1999 | Calloway | 29/895.21 |
| 6,394,943 | B1 | * | 5/2002 | Cormier et al. | 492/47 |
| 2002/0010062 | A1 | * | 1/2002 | Holopainen et al. | 492/16 |

* cited by examiner

*Primary Examiner*—Irene Cuda Rosenbaum
(74) *Attorney, Agent, or Firm*—Richard M. Goldberg

(57) ABSTRACT

A printing roller system includes a hollow, cylindrical mandrel which is closed at opposite ends thereof, with an air inlet in one end and a radial bore extending through the mandrel; journal members rotatably holding the mandrel; a resilient and compressible covering layer fixedly mounted on the mandrel and including a cut-away groove in fluid communication with the radial bore; an inelastic printing sleeve removably mounted on the covering layer; and a pressurized air supply connected with the air inlet for supplying the pressurized air to an interior of the mandrel and out through the radial bore and the cut-away groove to a position between at least a portion of the sleeve and the covering layer in order to compress the covering layer and permit mounting of the sleeve on the covering layer and dismounting of the sleeve from the covering layer.

17 Claims, 2 Drawing Sheets

PRINTING ROLLER HAVING PRINTING SLEEVE MOUNTED THEREON ROLLER

BACKGROUND OF THE INVENTION

The present invention relates generally to printing presses, and more particularly, is directed to a printing roller having a printing sleeve mounted thereon, and a method for mounting and dismounting printing sleeves from the printing roller.

In the printing press art, printing sleeves are fit onto rigid, incompressible printing cylinders. The sleeves are relatively expensive to manufacture.

U.S. Pat. No. 4,903,597 to Honge et al discloses a method of mounting a sleeve on a printing cylinder by supplying pressurized air between the printing cylinder and the sleeve in order to enable the sleeve to slide onto the printing cylinder. As with conventional printing cylinders, the printing cylinder of Honge et al is made of a rigid material that is not compressible. However, the sleeve is made of an elastic or resilient material, and specifically, a polymeric laminate material which has a constant thickness and cross-sectional diameter. Initially, a portion of the sleeve is force fit onto the cylinder, and thereafter, pressurized air is supplied through the interior of the cylinder and then through radial oriented holes in the cylinder. As a result, the sleeve expands by the force of the air pressure, providing a cushion of air between the sleeve and the rigid printing cylinder. This permits the sleeve to easily slide over the printing cylinder. However, as with conventional methods, the sleeve is relatively expensive. Related inventions which disclose expanding the outer sleeve by means of air pressure are disclosed in U.S. Pat. No. 5,324,248 to Quigley and U.S. Pat. No. 5,497,549 to Rademacher. However, again, specialized and expensive sleeves must be used.

U.S. Pat. No. 4,378,622 to Pinkston et al discloses a method of making a compressible printing roller. The roller includes a rigid shaft having a microporous inner layer made of a rubber material thereon. The inner layer is made of a cured and leached rubber material with interconnected cavities defined therein such that the voids represent between 30% to 70% of the total volume of the microporous inner layer. A thin tubular outer layer made of any suitable polymeric material which is non-porous and of solid cross-section throughout and free of voids, is mounted on the inner layer. In order to do so, the inner layer is compressed, whereupon the tubular outer layer is inserted thereover. Then, the inner layer is released, whereupon it expands and grabs the outer layer. The means for compressing the inner layer is a metal sleeve tool placed around the tubular inner layer, which is removed after the tubular outer layer is placed over the inner layer. It is clear from this patent that the outer layer is not intended to be easily replaced once the outer layer is inserted over the inner layer. Further, because of the porous nature of the inner layer, pressurized air could not be used for compressing the same.

Other patents are interest are U.S. Pat. Nos. 4,178,664; 4,391,898; 5,216,954; 5,256,459; 5,351,616; 5,352,507; 5,415,612; 5,520,600; 5,544,584; and 5,577,443.

OBJECTS AND SUMMARY OF THE INVENTION

Accordingly, it is an object of the present invention to provide a printing roller having a printing sleeve mounted thereon, and a method for mounting and dismounting sleeves from the printing roller, that overcomes the problems with the aforementioned prior art.

It is another object of the present invention to provide a non-expandable printing sleeve mounted on a compressible printing roller.

It is still another object of the present invention to mount the sleeve on the printing roller by providing pressurized air between the sleeve and printing roller in order to compress a covering layer of the printing roller.

It is yet another object of the present invention to provide a printing roller having a sleeve mounted thereon, and a method for mounting and dismounting sleeves from the printing roller that is easy and economical to use and manufacture.

In accordance with an aspect of the present invention, a roller system includes a cylindrical member; a covering layer fixedly mounted on the mandrel, the covering layer being resilient and compressible; a sleeve made of a non-expandable material and removably mounted on the covering layer; and an arrangement for supplying a pressurized gas between the covering layer and the sleeve in order to compress the covering layer and permit mounting of the sleeve on the covering layer and dismounting of the sleeve from the covering layer.

Preferably, the cylindrical member is comprised of a cylindrical mandrel with a cylindrical surface having at least one bore extending therethrough; the covering layer includes at least one opening in fluid communication with the at least one bore; and the arrangement for supplying a pressurized gas includes a supply of pressurized gas connected with the at least one bore for supplying the pressurized gas through the at least one bore and out through the at least one opening to a position between at least a portion of the sleeve and the covering layer.

The at least one bore is located close to one end of the mandrel. In one embodiment, the at least one opening is formed by a substantially annular cut-away groove in the covering layer. In another embodiment, the at least one opening includes a plurality of interconnected openings in the covering layer. Further, the at least one opening is provided at an angle relative to a direction perpendicular to an axial direction of the mandrel, with the angle being in a range of approximately 30° to 45°.

There is further a device connected with the cylindrical member for rotatably holding the cylindrical member.

The covering layer is made of a material selected from the group consisting of rubber, urethane and polymers. The material can be a a closed cell foam material or an open cell foam material with a non-porous layer thereover. The sleeve is made of a metal material or a plastic material.

In accordance with another aspect of the present invention, a method of mounting a non-compressible sleeve on a resilient and compressible covering layer of a roller and dismounting the sleeve from the covering layer of the roller, includes the steps of supplying a pressurized gas to a position between at least a portion of the sleeve and the covering layer; compressing the resilient and compressible covering layer with the pressurized gas to an outer diameter slightly smaller than an inner diameter of the sleeve; axially moving the sleeve over the compressed covering layer when mounting the sleeve on the covering layer; stopping the supply of the pressurized gas from the position between at least a portion of the sleeve and the covering layer such that the covering layer expands to form an interference fit between the sleeve and the covering layer; and axially moving the sleeve from the compressed covering layer when removing the sleeve from the covering layer after the covering layer has been compressed.

The step of supplying pressurized gas to the position between at least a portion of the sleeve and the covering layer, includes the step of supplying the pressurized gas from an interior of the covering layer through at least one opening to a position between at least a portion of the sleeve and the covering layer in order to compress the covering layer and permit mounting of the sleeve on the covering layer and dismounting of the sleeve from the covering layer.

Preferably, the covering layer is mounted on a mandrel having at least one bore therein in fluid communication with the at least one opening in the covering layer; and the step of supplying pressurized gas to the position between at least a portion of the sleeve and the covering layer, includes the step of supplying the pressurized gas from an interior of the mandrel through the at least one bore and the at least one opening to a position between at least a portion of the sleeve and the covering layer in order to compress the covering layer and permit mounting of the sleeve on the covering layer and dismounting of the sleeve from the covering layer.

In another embodiment, the step of supplying pressurized gas to the position between at least a portion of the sleeve and the covering layer, includes the step of supplying the pressurized gas through an end of the mandrel to the interior of the mandrel from a supply of pressurized gas.

The above and other objects, features and advantages of the invention will become readily apparent from the following detailed description thereof which is to be read in connection with the accompanying drawings.

DETAILED DESCRIPTION

Figure 1:
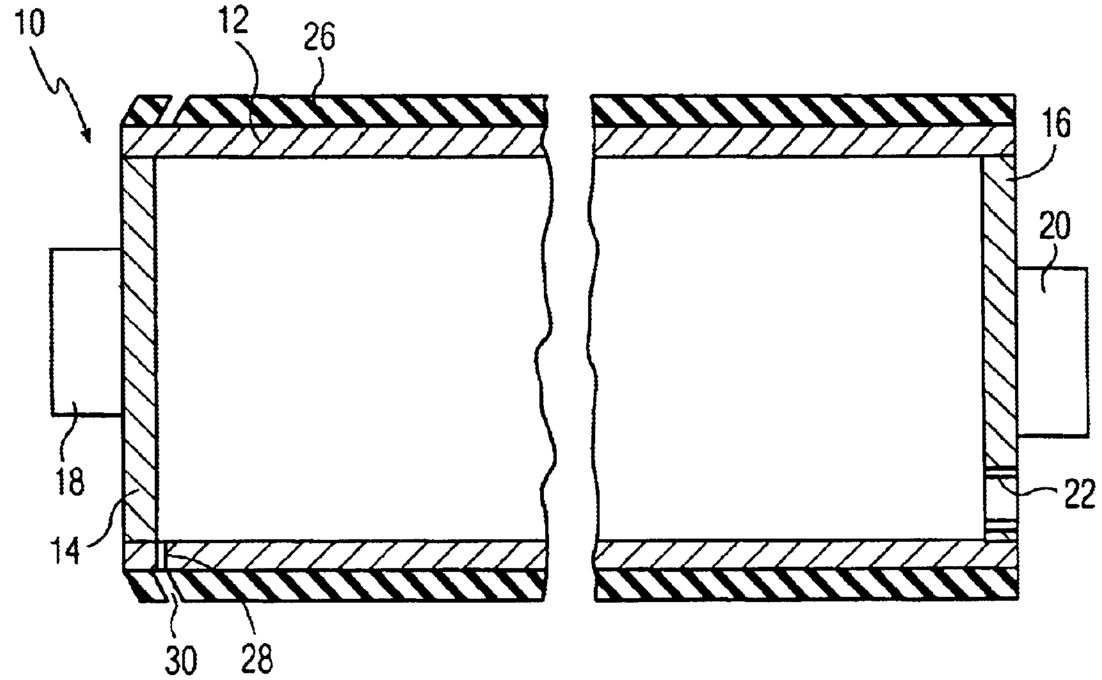
FIG. 1 is a cross-sectional view of a printing roller according to a first embodiment of the present invention.

Referring to the drawings in detail, and initially to FIG. 1 thereof, there is shown a printing roller 10 according to a first embodiment of the present invention. Printing roller 10 includes a cylindrical member which is preferably a hollow, cylindrical printing mandrel 12 which is closed at both ends by circular end walls 14 and 16. Printing roller 10 is rotatably journaled by journal members 18 and 20 secured to end walls 14 and 16. Alternatively, journal members 18 and 20 can be replaced by a center shaft passing through and secured to end walls 14 and 16. Mandrel 12 is made of a rigid metal material.

Figure 3:
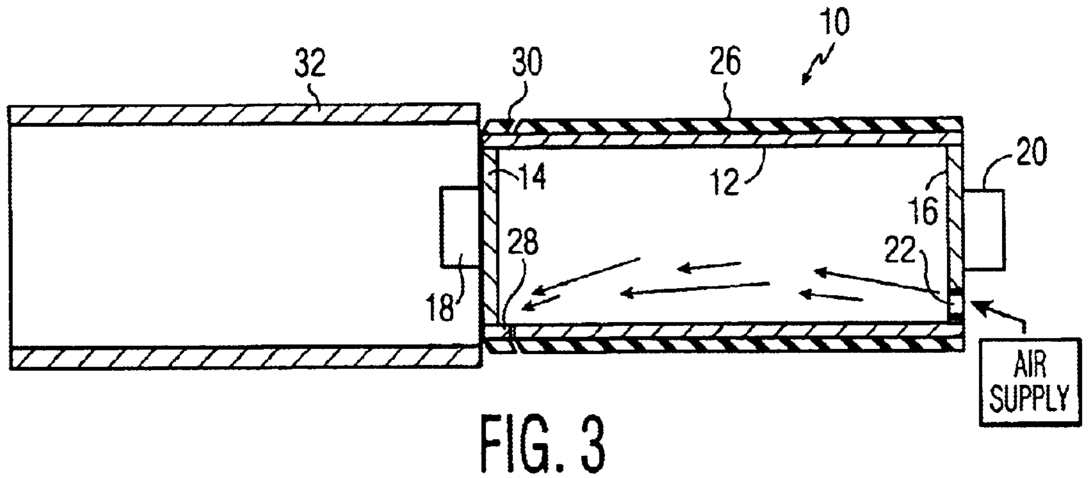
FIG. 3 is a cross-sectional view, similar to FIG. 1, showing the start of an operation for mounting a sleeve on the printing roller.
Figure 4:
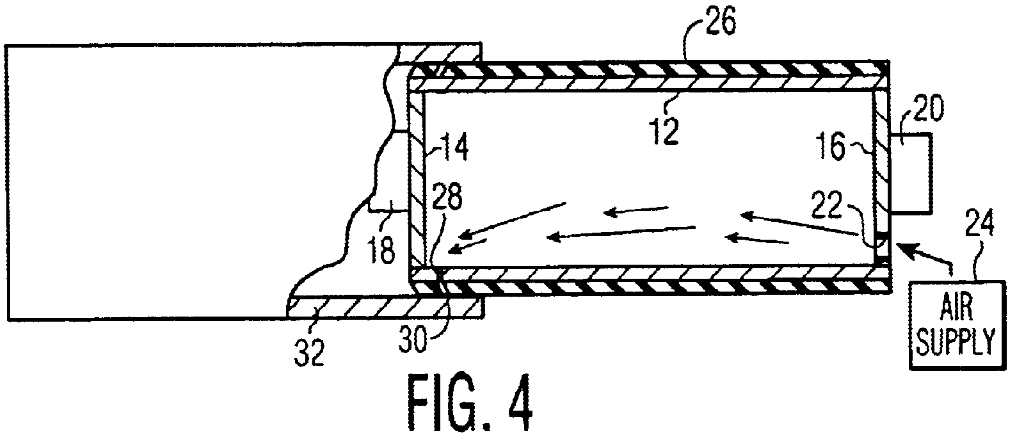
FIG. 4 is a cross-sectional view, similar to FIG. 1, showing the middle of an operation for mounting a sleeve on the printing roller.
Figure 5:
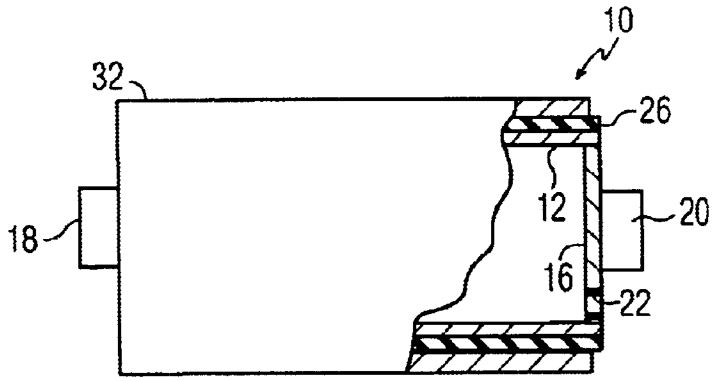
FIG. 5 is a cross-sectional view, similar to FIG. 1, showing the end of an operation for mounting a sleeve on the printing roller.

End wall 16 is provided with a threaded opening 22 which can threadedly receive an end of a hose (not shown) connected to an air supply 24 (FIGS. 3–5).

A covering layer 26 is fixedly mounted on mandrel 12, and is made of a resilient, compressible and deformable material, such as rubber, urethane or the like. The material must also having an elastic limit that is higher than the stress induced thereon so as to prevent permanent deformation. Some rubbers are not compressible. In this regard, a preferred material is a compressible foam/hard urethane material having a thickness in the range of 0.1875 inch to 0.25 inch. Preferably, the material of covering layer 26 will compress at least 0.025 inch under a pressure of 60 psi, while also being as hard as possible, having a high wear resistance and a high coefficient of friction. More preferably, the material should compress from a nominal outer diameter of 3 inches ±0.001 inch to an outer diameter of 2.995 inch ±0.001 inch under a pressure of 75 psi or 5 bar. For example, if the outside diameter of rubber covering layer 26 is 2.92 inches, it is desirable that rubber covering layer 26 be capable of compression to about 2.87 inches. As another example, if the outside diameter of rubber covering layer 26 is 3.07 inches, it is desirable that rubber covering layer 26 be capable of compression to about 3.02 inches.

Figure 2:
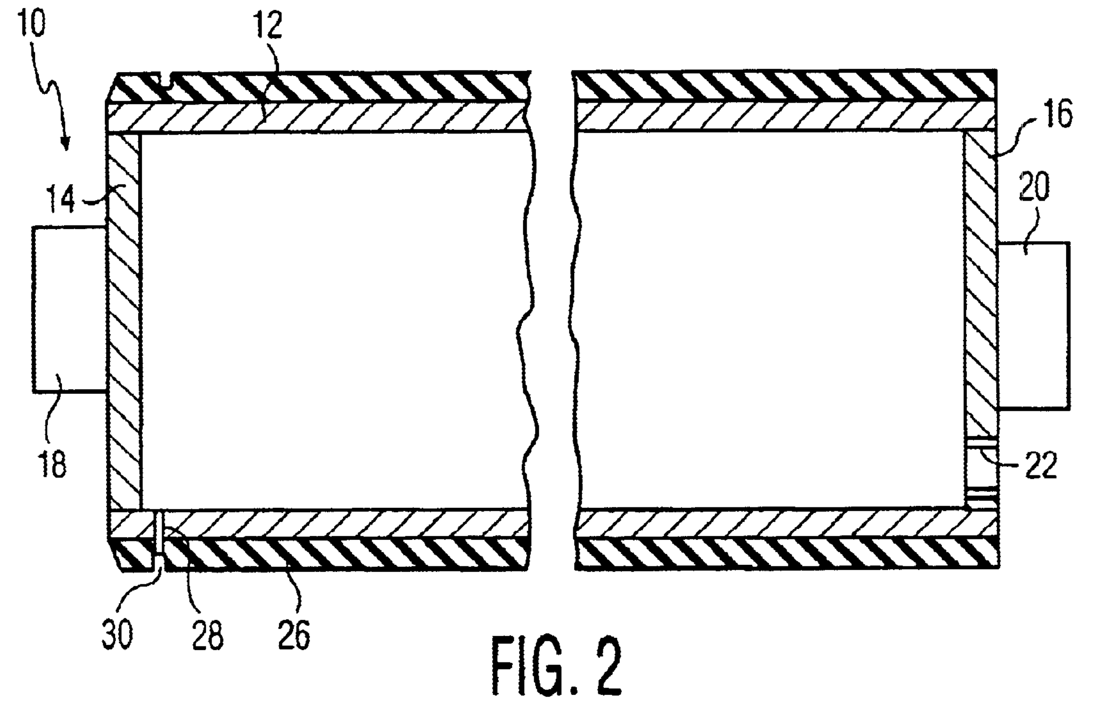
FIG. 2 is a cross-sectional view of a printing roller according to a second embodiment of the present invention.

In accordance with an important aspect of the present invention, a bore 28 extends through the cylindrical wall of mandrel 12 at one end thereof, preferably at an end thereof which is adjacent end wall 14, that is, farther away from end wall 16 at which threaded opening 22 is provided. Preferably, bore 28 is located as close to end wall 14 as possible. Bore 28 can have any suitable dimension, which is dependent on the diameter and length of mandrel 12, but preferably has a diameter of about ⅛ inch. In addition, a cut-away groove 30 extends through rubber covering layer 26 in fluid communication with bore 28. In this manner, the hollow interior of mandrel 12 is in open, fluid communication with the exterior of roller 10. Preferably, cut-away groove 30 is formed by an annular cut-away portion of rubber covering layer 26, and preferably, the cut-away portion is angled in the range of about 30° to 45°, as shown in FIG. 1. However, cut-away groove 30 can also be provided without the angular range, for example, in line with bore 28, as shown in the alternative embodiment of FIG. 2. Cut-away groove 30 can have any suitable dimension, although a preferred width is about 0.25 inches. In like manner, the depth of groove 30 can be any suitable dimension, although a preferred depth is about 0.125 inches. The radial outer portion of cut-away groove 30 must be sufficiently large to allow air to exit through cut-away groove 30.

Alternatively, a plurality of interconnected bores can be provided in place of cut-away groove 30.

A printing sleeve 32, as shown in FIGS. 3–5, is removably mounted on rubber covering layer 26. Unlike specialized and expensive printing sleeves according to the prior art, printing sleeve 32 is formed of a non-expandable material, such as an inexpensive aluminum or other metal, plastic or composite sleeve. The inner diameter of printing sleeve 32 is slightly less than the outer diameter of rubber covering layer 26. For example, if rubber covering layer 26 has an outer-diameter of 2.92 inches, printing sleeve 32 can have an inner diameter of 2.90 inches, with a tolerance of ±0.005 inch, so that the inner diameter of printing sleeve 32 would be in the range of 2.895 inches to 2.905 inches.

In order to insert printing sleeve 32 onto rubber covering layer 26, the latter must be compressed, for example, to an outer diameter of 2.88 inches. In order to accomplish this, printing sleeve 32 is initially force fit over an initial portion of rubber covering layer 26 in the axial direction until printing sleeve 32 covers cut-away groove 30, as shown in FIG. 4. Pressurized air from air supply 24 is then supplied to the hollow interior of printing roller 10 through threaded opening 22. The pressurized air then travels through the hollow interior and exits through radially directed bore 28 and cut-away groove 30. Because of the elastic nature of rubber covering layer 26 and the inelastic nature of aluminum printing sleeve 32, rubber covering layer 26 is forced to compress. Preferably, the pressure of the pressurized air is at least 60 psi. This permits sleeve 32 to easily slide over covering layer 26, as shown in FIGS. 4 and 5. When sleeve 32 is fully slid over covering layer 26, as shown in FIG. 5, the pressurized air from air supply 24 is stopped, whereupon covering layer 26 expands to its original outer diameter, thereby locking printing sleeve 32 in position.

When printing sleeve 32 is changed, it is only necessary to perform the reverse procedure. In such case, pressurized air from air supply 32 is supplied through cut-away groove 30 so as to compress covering layer 26 and thereby permit printing sleeve 32 to be removed in the reverse order from FIG. 5 to FIG. 3, and a new printing sleeve 32 thereafter replaced on covering layer 26.

Thus, with the present invention, an inexpensive aluminum, steel or plastic printing sleeve 32 can be used, thereby greatly reducing the cost of the system. Further, when printing sleeve 32 becomes worn, it is very easy and inexpensive to replace printing sleeve 32, without any complicated arrangements.

It will be appreciated that the present invention can be modified in accordance with the claims herein. Specifically, end walls 14 and 16 and threaded opening 22 can be eliminated, and in such case, a pipe can extend through the open ends of the mandrel and be connected directly with bore 28.

Although the present invention has been discussed in relation to printing rollers, it has wider applicability and applies to rollers in general.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A roller system comprising:

a cylindrical member;

a covering layer fixedly mounted on said cylindrical member, said covering layer being resilient and compressible;

a sleeve made of a non-expandable material and removably mounted on said covering layer; and an arrangement for supplying a pressurized gas between said covering layer and said sleeve in order to compress said covering layer and permit mounting of said sleeve on said covering layer and dismounting of said sleeve from said covering layer.

2. A roller system according to claim 1, wherein:

said cylindrical member is comprised of a cylindrical mandrel with a cylindrical surface having at least one bore extending therethrough;

said covering layer includes at least one opening in fluid communication with said at least one bore; and said arrangement for supplying a pressurized gas includes a supply of pressurized gas connected with said at least one bore for supplying said pressurized gas through said at least one bore and out through said at least one opening to a position between at least a portion of said sleeve and said covering layer.

3. A roller system according to claim 2, wherein said at least one bore is located close to one end of said mandrel.

4. A roller system according to claim 2, wherein said at least one opening is formed by a substantially annular cut-away groove in said covering layer.

5. A roller system according to claim 2, wherein said at least one opening includes a plurality of interconnected openings in said covering layer.

6. A roller system according to claim 2, wherein said at least one opening is provided at an angle relative to a direction perpendicular to an axial direction of said mandrel.

7. A roller system according to claim 6, wherein said angle is in a range of approximately 30° to 45°.

8. A roller system according to claim 1, further comprising a device connected with said cylindrical member for rotatably holding said cylindrical member.

9. A roller system according to claim 1, wherein said covering layer is made of a material selected from the group consisting of rubber, urethane and polymers.

10. A roller system according to claim 9, wherein said covering layer is made from a closed cell foam material.

11. A roller system according to claim 9, wherein said covering layer is made from an open cell foam material with a non-porous layer thereover.

12. A roller system according to claim 1, wherein said sleeve is made of a metal material.

13. A roller system according to claim 1, wherein said sleeve is made of a plastic material.

14. A method of mounting a non-compressible sleeve on a resilient and compressible covering layer of a roller and dismounting said sleeve from said covering layer of said roller, said method comprising the steps of:

supplying a pressurized gas to a position between at least a portion of said sleeve and said covering layer;

compressing said resilient and compressible covering layer with said pressurized gas to an outer diameter slightly smaller than an inner diameter of said sleeve;

axially moving said sleeve over the compressed covering layer when mounting said sleeve on the covering layer;

stopping the supply of said pressurized gas from said position between at least a portion of said sleeve and said covering layer such that said covering layer expands to form an interference fit between the sleeve and said covering layer; and axially moving said sleeve from the compressed covering layer when removing said sleeve from the covering layer after said covering layer has been compressed.

15. A method according to claim 14, wherein said step of supplying pressurized gas to said position between at least a portion of said sleeve and said covering layer, includes the step of supplying said pressurized gas from an interior of said covering layer through at least one opening to a position between at least a portion of said sleeve and said covering layer in order to compress said covering layer and permit mounting of said sleeve on said covering layer and dismounting of said sleeve from said covering layer.

16. A method according to claim 14, wherein:

said covering layer is mounted on a mandrel having at least one bore therein in fluid communication with said at least one opening in said covering layer; and said step of supplying pressurized gas to said position between at least a portion of said sleeve and said covering layer, includes the step of supplying said pressurized gas from an interior of said mandrel through said at least one bore and said at least one opening to a position between at least a portion of said sleeve and said covering layer in order to compress said covering layer and permit mounting of said sleeve on said covering layer and dismounting of said sleeve from said covering layer.

17. A method according to claim 14, wherein said step of supplying pressurized gas to said position between at least a portion of said sleeve and said covering layer, includes the step of supplying said pressurized gas through an end of said mandrel to said interior of said mandrel from a supply of pressurized gas.

* * * * *